US008515194B2

(12) United States Patent
Srinivasan et al.

(10) Patent No.: US 8,515,194 B2
(45) Date of Patent: Aug. 20, 2013

(54) SIGNALING AND USES OF WINDOWING INFORMATION FOR IMAGES

(75) Inventors: Sridhar Srinivasan, Redmond, WA (US); Chengjie Tu, Sammamish, WA (US); Shankar Regunathan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1070 days.

(21) Appl. No.: 11/772,019

(22) Filed: Jun. 29, 2007

(65) Prior Publication Data

US 2008/0199091 A1    Aug. 21, 2008

Related U.S. Application Data

(60) Provisional application No. 60/891,036, filed on Feb. 21, 2007.

(51) Int. Cl.
*G06K 9/36*    (2006.01)
*G06K 9/46*    (2006.01)

(52) U.S. Cl.
USPC ............ 382/239; 382/232; 382/233; 382/235

(58) Field of Classification Search
USPC .................................................. 382/232–239
See application file for complete search history.

(56) References Cited

U.S. PATENT DOCUMENTS

| | | | |
|---|---|---|---|
| 5,134,697 A | 7/1992 | Scheffler et al. | |
| 5,390,029 A * | 2/1995 | Williams et al. | 358/448 |
| 5,623,308 A | 4/1997 | Civanlar et al. | |
| 5,751,865 A * | 5/1998 | Micco et al. | 382/296 |
| 5,872,872 A | 2/1999 | Kajiwara | |
| 5,936,616 A | 8/1999 | Torborg, Jr. et al. | |
| 5,995,146 A | 11/1999 | Rasmussen | |
| 6,020,931 A | 2/2000 | Bilbrey et al. | |
| 6,049,333 A | 4/2000 | LaJoie et al. | |
| 6,078,403 A | 6/2000 | Palmer | |
| 6,088,045 A | 7/2000 | Lumelsky et al. | |
| 6,141,442 A | 10/2000 | Chen | |
| 6,223,181 B1 * | 4/2001 | Goldberg et al. | 1/1 |
| 6,256,785 B1 | 7/2001 | Klappert et al. | |
| 6,263,313 B1 | 7/2001 | Milsted et al. | |
| 6,298,166 B1 * | 10/2001 | Ratnakar et al. | 382/248 |
| 6,421,465 B2 * | 7/2002 | Tan | 382/232 |
| 6,456,335 B1 | 9/2002 | Miura et al. | |
| 6,493,008 B1 | 12/2002 | Yui | |
| 6,510,177 B1 | 1/2003 | De Bonet et al. | |

(Continued)

FOREIGN PATENT DOCUMENTS

EP     1826724 A1    8/2007

OTHER PUBLICATIONS

Rabbani et al. "An overview of the JPEG 2000 still image compression standard", Signal Processing: Image communication 17 (2002), 3-48.*

(Continued)

*Primary Examiner* — Li Liu
(74) *Attorney, Agent, or Firm* — Klarquist Sparkman, LLP

(57) ABSTRACT

Techniques and tools for signaling and using image tiling information (such as syntax elements relating index tables and header size), signaling and using windowing information (such as techniques for using windowing parameters when rotating, cropping or flipping images), and signaling and using alpha channel information are described.

23 Claims, 11 Drawing Sheets

(56) References Cited

U.S. PATENT DOCUMENTS

| | | | |
|---|---|---|---|
| 6,724,434 B1 | 4/2004 | Aaltonen | |
| 7,023,492 B2 | 4/2006 | Sullivan | |
| 7,054,496 B2* | 5/2006 | Miceli et al. | 382/235 |
| 7,068,395 B1 | 6/2006 | Tanioka et al. | |
| 7,120,924 B1 | 10/2006 | Katcher et al. | |
| 7,177,488 B2* | 2/2007 | Berkner et al. | 382/298 |
| 2003/0147563 A1* | 8/2003 | Liu et al. | 382/276 |
| 2004/0114813 A1* | 6/2004 | Boliek et al. | 382/233 |
| 2006/0098031 A1 | 5/2006 | Lai et al. | |
| 2006/0165286 A1 | 7/2006 | Kaku | |
| 2006/0204113 A1* | 9/2006 | Wang et al. | 382/236 |
| 2006/0215752 A1* | 9/2006 | Lee et al. | 375/240.08 |
| 2006/0238444 A1* | 10/2006 | Wang et al. | 345/55 |
| 2007/0258641 A1* | 11/2007 | Srinivasan et al. | 382/166 |
| 2007/0280346 A1 | 12/2007 | Tu et al. | |
| 2008/0007648 A1* | 1/2008 | Chen et al. | 348/441 |

OTHER PUBLICATIONS

Grosbois et al. "New approach to JPEG 2000 compliant Region of Interest coding", Proc. of the SPIE's 46the annual meeting, Applications of Digital Image Processing, 2001.*
Christopoulos et al. "The JPEG2000 still image coding system: An overview", IEEE Transactions on Consumer Electronics, v. 46, No. 4, pp. 1103-1127, 2000.*
Santa-Cruz, et al. "JPEG 2000 performance evaluation and assessment", Signal Processing: Image communication 17 (2002), 113-130.*
Crow, "Windows Media Photo," downloaded on Feb. 29, 2008 from http://download.microsoft.com/download/5/b/9/5b97017b-e28a-4bae-ba48-174cf47d23cd/PRI115_WH06.ppt, 2006, 5 pages.
ISO/IEC, "Coding of Moving Pictures and Associated Audio for Digital Storage Media at Up to About 1.5 Mbit/s, Part 2: Video," 11172-2, 112 pp. (1993).
ISO/IEC, "Coding of Audio-Visual Objects: Visual, ISO/IEC 14496-2," 14496-2, 330 pp. (1998).
ITU-T Recommendation H.261, "Line of Transmission of Non-Telephone Signals," International Telecommunications Union, pp. i, 1-25 (Mar. 1993).
ITU-T Recommendation H.262, "Transmission of Non-Telephone Signals," International Telecommunications Union, 204 pp. (Jul. 1995).
ITU-T Recommendation H.263, "Series H: Audiovisual and Multimedia Systems, Infrastructure of Audiovisual Services—Coding of Moving Video," International Telecommunications Union, 155 pp. (Feb. 1998).
Ladebusch, "Co-ordination of identification numbers for DVB (digital video broadcasting) programs," *Fernseh-und Kino-Technik*, vol. 54, No. 7, pp. 410-414 (Jul. 2000) (Abstract Only).
Miao-Ling et al., "Video stream segmentation method based on video page," *Journal of Computer Aided Design & Computer Graphics*, vol. 12, No. 8, pp. 585-589 (Aug. 2000) (Abstract Only).
Muranoi et al., "Video Retrieval Method using ShotID for Copyright Protection Systems," *Proc. SPIE* vol. 3527, pp. 245-252 (Nov. 1998).
Reader, "History of MPEG Video Compression—Ver. 4.0," 99 pp. [Document marked Dec. 16, 2003].
Rosenbaum et al., "Merging images in JPEG2000-domain," From Proceeding (396) Visualization, Imaging, and Image Processing, 2003, 4 pages.
Schumeyer et al., "A Color-Based Classifier for Region Identification in Video," *SPIE*, vol. 3309, pp. 189-200, 1998.
Smith et al., "Compressed Domain Processing of JPEG-encoded images," Real-Time Imaging, vol. 2, No. 1, 1996, pp. 3-17.
Sullivan et al., "The H.264/AVC Advanced Video Coding Standard: Overview and Introduction to the Fidelity Range Extensions," 21 pp. (Aug. 2004).
Wiegand, "Joint Model No. 1, Revision 1 (JM1-r1)," JVT-A003r1, 80 pp. (Document marked "Generated: Jan. 18, 2002").

* cited by examiner

Software 180 implementing described techniques and tools for media data encoding/decoding Macroblock aligned internal representation Macroblock aligned internal representation $$\mod(x) = \begin{cases} x\%16 & OL\_NONE \\ \begin{cases} x\%16 & if \quad x\%16 \geq 2 \\ 16+(x\%16) & if \quad x\%16 < 2 \end{cases} & OL\_ONE \\ \begin{cases} x\%16 & if \quad x\%16 \geq 10 \\ 16+(x\%16) & if \quad x\%16 < 10 \end{cases} & OL\_TWO \end{cases}$$

SIGNALING AND USES OF WINDOWING INFORMATION FOR IMAGES

RELATED APPLICATION INFORMATION

This application claims the benefit of U.S. Provisional Patent Application No. 60/891,036, filed Feb. 21, 2007, the disclosure of which is hereby incorporated by reference.

SUMMARY

In summary, the detailed description is directed to aspects of encoding and decoding digital media data, and in particular, encoding and decoding digital media data in digital media encoders and decoders.

For example, techniques and tools for signaling and using image tiling information (such as syntax elements relating to index tables), signaling and using windowing information (such as techniques for using windowing parameters when rotating, cropping or flipping images), and signaling and using alpha channel information are described.

In one aspect, a method comprises receiving windowing information for an image; performing an image crop operation, image flip operation, or image rotation operation, wherein the received windowing information is processed during the performing; and outputting a result of the image crop operation, image flip operation, or image rotation operation.

In another aspect, a method comprises receiving information for a tiled image, the information for the tiled image comprising index table information; and decoding the tiled image, wherein the decoding comprises processing the index table information to determine whether an index table is present in the received information for the tiled image; and outputting a result of the decoding.

In another aspect, a method comprises receiving information for a tiled image, the information for the tiled image comprising header size information; decoding the tiled image, wherein the decoding comprises processing the header size information to determine whether abbreviated representations are used to represent tiling parameters in the received information for the tiled image; and outputting a result of the decoding.

In another aspect, a method comprises receiving information for an image, the information comprising alpha plane information; decoding the image, wherein the decoding comprises processing the alpha plane information to jointly determine whether an alpha plane is present and one or more other image encoding characteristics for the image; and outputting a result of the decoding.

This summary is provided to introduce a selection of concepts in a simplified form that are further described below in the detailed description. This summary is not intended to identify key features or essential features of the claimed subject matter, nor is it intended to be used to limit the scope of the claimed subject matter.

The foregoing and other objects, features, and advantages will become more apparent from the following detailed description, which proceeds with reference to the accompanying figures.

DETAILED DESCRIPTION

The present application relates to techniques and tools for efficient compression and decompression of digital media data. In various described embodiments, a still image encoder and/or decoder incorporate techniques for compressing and/or decompressing image data.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific digital media formats, other formats also can be used.

The various techniques and tools can be used in combination or independently. Different embodiments implement one or more of the described techniques and tools. Some techniques and tools described herein can be used in a still image encoder or decoder, or in some other system not specifically limited to still image encoding or decoding.

I. Computing Environment

Figure 1:
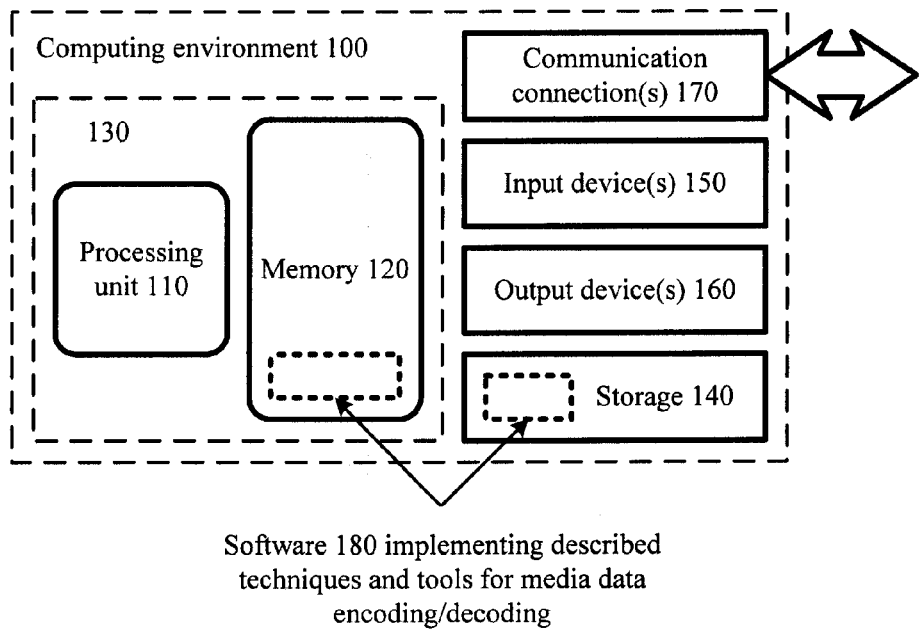
FIG. 1 is a block diagram of a suitable computing environment in which described techniques and tools can be implemented.

FIG. 1 illustrates a generalized example of a suitable computing environment 100 in which several of the described embodiments may be implemented. The computing environment 100 is not intended to suggest any limitation as to scope of use or functionality, as the techniques and tools may be implemented in diverse general-purpose or special-purpose computing environments.

With reference to FIG. 1, the computing environment 100 includes at least one processing unit 110 and memory 120. In FIG. 1, this most basic configuration 130 is included within a dashed line. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. The memory 120 stores software 180 implementing a digital media encoder or decoder with one or more of the described techniques and tools.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, DVDs (including high-definition DVDs), or any other medium which can be used to store information and which can be accessed within the computing environment 100. The storage 140 stores instructions for the software 180 implementing the digital media encoder or decoder.

The input device(s) 150 may be a touch input device such as a keyboard, mouse, pen, or trackball, a voice input device, a scanning device, still image capture device (e.g., digital camera), or another device that provides input to the computing environment 100. For audio or video encoding, the input device(s) 150 may be a sound card, video card, TV tuner card, or similar device that accepts audio or video input in analog or digital form, or a CD-ROM or CD-RW that reads audio or video samples into the computing environment 100. The output device(s) 160 may be a display, printer, speaker, CD- or DVD-writer, or another device that provides output from the computing environment 100.

The communication connection(s) 170 enable communication over a communication medium to another computing entity. The communication medium conveys information such as computer-executable instructions, digital media input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 100, computer-readable media include memory 120, storage 140, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "select" and "receive" to describe computer operations in a computing environment. These terms are high-level abstractions for operations performed by a computer, and should not be confused with acts performed by a human being. The actual computer operations corresponding to these terms vary depending on implementation.

II. Signaling and Use of Index Table Information
INDEXTABLE_PRESENT_FLAG

To process large images, a described implementation uses a tiling scheme is used to partition images. A tile is typically a 2-dimensional group of adjacent macroblocks. Tiles can form a regular pattern on the image—e.g., tiles in a horizontal row are of the same height and aligned; tiles in a vertical column are of the same width and aligned. An image may contain between 1 and 4096 columns of tiles in the horizontal direction and between 1 and 4096 rows of tiles in the vertical direction. Tiles can be independently decoded and encoded (e.g., transform coefficients in a tile are coded independently of coefficients present in other tiles). When an image contains one tile, it can be referred to as "untiled." If the number of tiles is greater than 1, the image can be referred to as "tiled."

Figure 2:
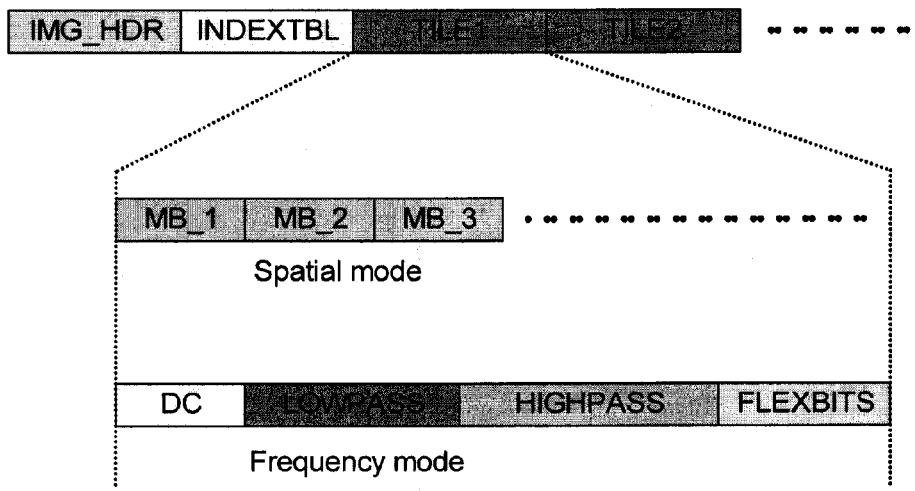
FIGS. 2 and 3 are diagrams showing parts of bitstreams having an index table for image tiling according to one implementation.

In one implementation, two modes of operation affecting the structure of the bitstream are used—spatial (SPATIALMODE) and frequency (FREQUENCYMODE). In both modes, the bitstream includes a header followed by a sequence of tiles as shown in FIG. 2. In the Spatial Mode, the bitstream of each tile is laid out in macroblock order. The compressed bits pertinent to each macroblock are located together. In the Frequency Mode, the bitstream of each tile is laid out as a hierarchy of frequency bands. In both modes, the tile subbands may be ordered arbitrarily. For example, the DC subband tiles can be ordered before the low pass tiles if progressive decode is the targeted application. The bitstream can also carry an index table which points to the location of each tile. The index table allows the decoder to determine the location of an individual tile.

The overhead for representing each entry in the index table for each tile can be up to 9 bytes. The overhead can be significant if the number of tiles in the image is large. The problem can be exacerbated if the bitstream is laid out in the frequency mode. The resulting overhead can be significant, and can degrade compression efficiency.

To allow flexibility in sending or not sending an index table, an encoder can use a syntax element to signal whether an index table is sent or not sent. An index table may not be sent, for example, when compression efficiency (less bit usage) is desired. In one implementation, INDEXTABLE_PRESENT_FLAG is a Boolean syntax element that specifies whether an index table is present in the bitstream. For example, if INDEXTABLE_PRESENT_FLAG==1, the index table is present in the bitstream. Further, if BITSTREAM_FORMAT==FREQUENCYMODE, or NUM_VERTTILES_MINUS1>0, or NUM_HORIZTILES_MINUS1>0, INDEXTABLE_PRESENT_FLAG is set to 1 and the index table is present in the bitstream. Otherwise, the index table is not present in the bitstream.

INDEXTABLE and INDEX_OFFSET_TABLE

Figure 3:
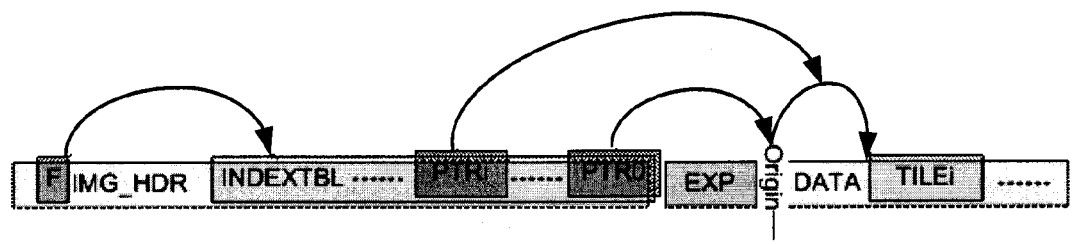

INDEXTABLE and the INDEX_OFFSET_TABLE are syntax elements used in one implementation. FIG. 3 is a syntax diagram showing an index table (INDEXTBL) within an image header (IMG_HDR) comprising a collection of pointers (PTRi) and an origin pointer (PTR0). PTR0 sets the origin of bitstream and tile pointers provide offsets from origin to respective tiles. EXP is a data segment for use in bitstream extensions.

III. Signaling and Use of Abbreviated Header Information

Height and width of tiles, as well as height and width of images, can be communicated to a decoder. The width and height of the tiles and the width and height of images can be very large for very large images. An image may contain between 1 and 4096 columns of tiles in the horizontal direction and between 1 and 4096 rows of tiles in the vertical direction. Further, each row of tiles may be between 1 unit and 65536 units wide and likewise each column of tiles may be between 1 unit and 65536 units high. (Units used in one implementation are macroblock units which are aligned 16×16 pixel areas.) A described signaling scheme can handle such large dimensions. However, in a typical usage scenario, image sizes and tile sizes can be small.

A syntax element can be used to help reduce overhead in signaling this information, such as for scenarios where small images are compressed, while preserving the flexibility to compress very large images. Overhead for signaling can be reduced to good rate-distortion performance for such scenarios.

In one implementation, the syntax element SHORT_HEADER_FLAG to reduce overhead for signaling image and tile dimensions, while preserving the flexibility to signal large dimensions. SHORT_HEADER_FLAG is a 1-bit syntax element in the image header that specifies the size of the syntax elements that represent width and height of the image and the tiles.

If SHORT_HEADER_FLAG==TRUE, abbreviated representations are used to represent image width, image height, tile widths and tile heights.

If SHORT_HEADER_FLAG==FALSE, non-abbreviated representations are used to represent image width, image height, tile widths and tile heights.

As an example, consider the case of a typical image such as a 6 megapixel camera image with size 3000×2000 pixels. This spans 188×125 macroblocks. Further, say this image is divided into 16 tiles, in 4 rows and 4 columns of roughly equal size. Therefore, the tile widths and heights are around 47 and 32 macroblock units respectively. In this case, the encoder may choose to minimize overhead by using the SHORT_HEADER_FLAG to signal an image width/height with 16 bits each (which is possible, since both these quantities are less than 65536), and to signal tile widths/heights (which is possible, since both these quantities are less than 256).

Some examples of other syntax elements that may be affected by SHORT_HEADER_FLAG are described below.
Width (WIDTH_MINUS1) (16 bits or 32 bits)

In one implementation, WIDTH_MINUS1 is a syntax element that specifies the width of the coded area minus 1. If SHORT_HEADER==TRUE, WIDTH_MINUS1 is a 16-bit syntax element. Otherwise, WIDTH_MINUS1 is a 32-bit syntax element. The width of the coded area is Width=WIDTH_MINUS1+1
Height (HEIGHT_MINUS1) (16 bits or 32 bits)

In one implementation, HEIGHT_MINUS1 is a syntax element that specifies the height of the coded area minus 1. If SHORT_HEADER==TRUE, HEIGHT_MINUS1 is a 16-bit syntax element. Otherwise, HEIGHT_MINUS1 is a 32-bit syntax element. The height of the coded area is Height=HEIGHT_MINUS1+1.
Width in MB of Tile n (WIDTH_IN_MB_OF_TILE_MINUS1[n]) (8 or 16 bits)

In one implementation, WIDTH_IN_MB_OF_TILE_MINUS1[n] is a syntax element that specifies the width (in macroblock units) of the nth tile along the horizontal direction minus 1. If SHORT_HEADER==TRUE, WIDTH_IN_MB_OF_TILE_MINUS1[n] is a 8-bit syntax element. Otherwise, it is a 16-bit syntax element.
Height in MB of Tile n (HEIGHT_IN_MB_OF_TILE_MINUS1[n]) (8 or 16 bits)

In one implementation, HEIGHT_IN_MB_OF_TILE_MINUS1[n] is a syntax element that specifies the height (in macroblock units) of the nth tile along the vertical direction minus 1. If SHORT_HEADER==1, HEIGHT_IN_MB_OF_TILE_MINUS1[n] is a 8-bit syntax element. Otherwise, it is a 16-bit syntax element.

IV. Signaling and Use of Windowing Information

Figure 4:
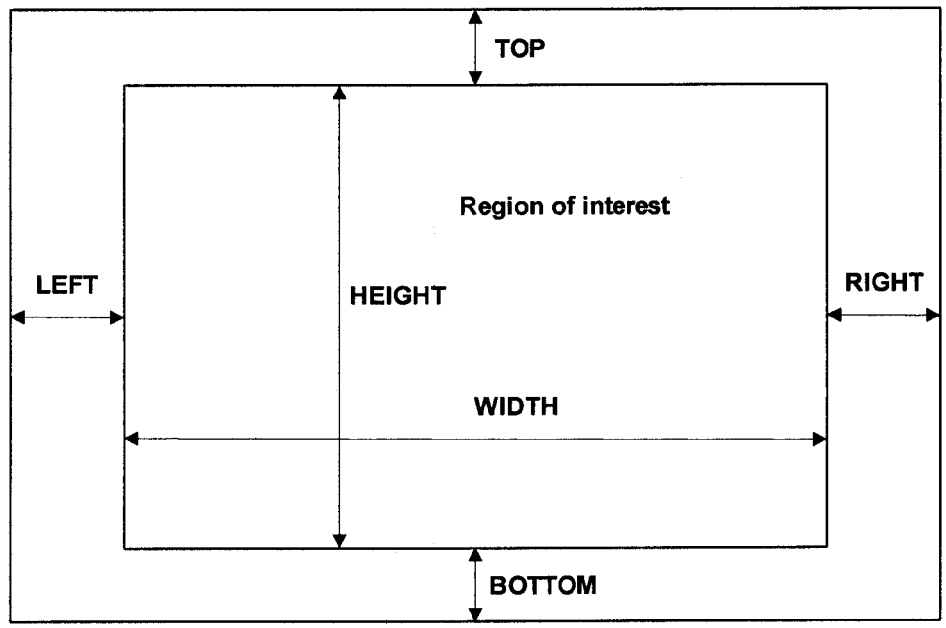
FIG. 4 is a diagram showing a region of interest window and windowing parameters for an image according to one implementation.

An internal representation of an image is can be macroblock aligned. However, if a window of a macroblock-aligned representation is of interest, a decoder can decode an image of that window size. An encoder can signal size of the window (which also can be referred to as a region of interest) by (WIDTH, HEIGHT) and position of the window by (LEFT, TOP, RIGHT, BOTTOM) as shown in FIG. 4.

Windowing information can be used for various purposes. For example, in one implementation, non-macroblock-aligned images can be handled and useful compressed domain operations can be performed, such as 90 degree rotation, mirror-flip, cropping, and combinations of such operations. Another benefit is that windowing information can be used to reduce encoder side complexity by avoiding 1 dimensional overlap operations at the image edges.

Windowing parameters (e.g., WIDTH, HEIGHT, LEFT, TOP, RIGHT, BOTTOM) will change for compressed domain operations, such as the following.

1. Compressed domain 90 degree rotation in the counter-clockwise direction:
   Change
   (WIDTH, HEIGHT, LEFT, TOP, RIGHT, BOTTOM) to
   (HEIGHT, WIDTH, BOTTOM, LEFT, TOP, RIGHT)
2. Compressed Domain Horizontal Flip:
   Change
   (WIDTH, HEIGHT, LEFT, TOP, RIGHT, BOTTOM) to
   (WIDTH, HEIGHT, RIGHT, TOP, LEFT, BOTTOM)
3. Compressed Domain Vertical Flip:
   Change
   (WIDTH, HEIGHT, LEFT, TOP, RIGHT, BOTTOM) to
   (WIDTH, HEIGHT, LEFT, BOTTOM, RIGHT, TOP)

Figures 5, 6:
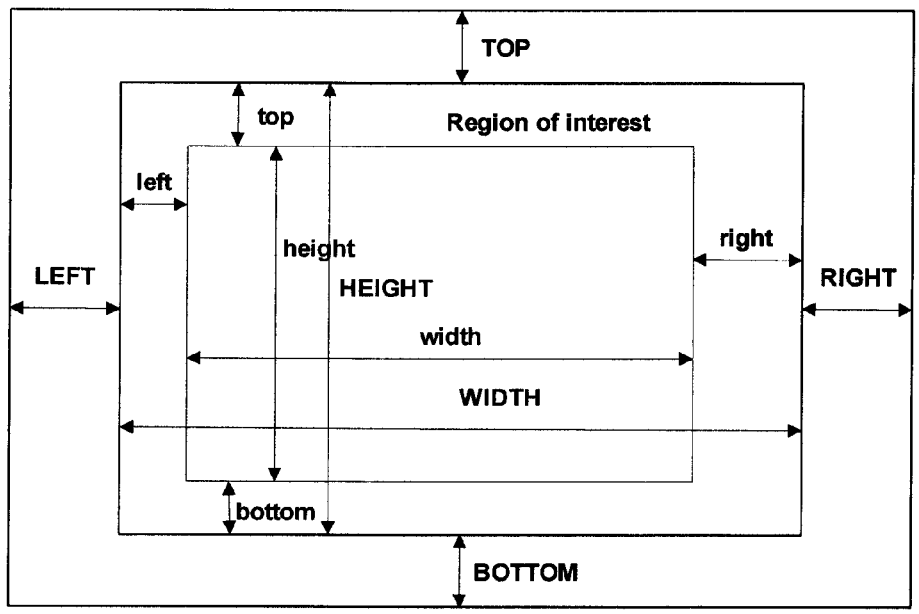
FIG. 5 is a diagram showing parameters for a region of interest window and parameters for a cropped region of interest window for an image according to one implementation.
FIG. 6 is a diagram showing an equation for a mod(x) calculation used during region of interest window cropping according to one implementation.

Referring to FIG. 5, for Compressed Domain Cropping, if a (Width, Height) window starting at (left, top) is cropped (the window must be contained in the original interested window), the new parameters are: (width, height, mod(left+LEFT), mod(top+TOP), mod(right+RIGHT), mod(bottom+BOTTOM)), where mod(x) is defined as shown in FIG. 6.

For compressed domain fast tile extraction, if a region of (width, height) containing exactly one or more tiles is extracted, the parameters changes to (width, height, s, s, s, s), where s=0 for OL_NONE, 2 for OL_ONE, and 10 for OL_TWO.

Cascades of the operations are possible with appropriate remappings to the six parameters. For example, 90 degree counterclockwise rotation is the cascade of horizontal flip, followed by vertical flip, followed by 90 degree rotation, and the parameters change to (WIDTH, HEIGHT, TOP, RIGHT, BOTTOM, LEFT).

If overlap is on, generally 2-dimensional overlap operators are applied. However, 1-dimensional overlap operators are needed at image edges. This added complexity can be non-trivial, especially for hardware implementation. Windowing parameters allow an encoder to avoid the 1-dimensional overlap operators by padding the input image such that no pixels of the input image are edge pixels of the padded image, and the 1-dimensional overlap operators do not affect the region of interest (the input image). Since edge pixels are padded (and discarded by the decoder), the encoder can skip overlap operations there. Each side can be padded by 1 macroblock. With macroblock alignment, the parameters will become (WIDTH, HEIGHT, 16, 16, 16+(16−WIDTH & 15)%16, 16+(16−HEIGHT&)%16).

V. Signaling and Use of Alpha Channel Information

A described image coder/decoder supports a wide range of pixel formats, including high dynamic range and wide gamut formats. Supported data types include signed integer, unsigned integer, fixed-point and floating-point. Supported bit depths include 8, 16, 24 and 32 bits per color channel. It allows for lossless compression of images that use up to 24 bits per color channel, and lossy compression of images that use up to 32 bits per color channel.

Pixel formats can have a separate alpha channel, which controls the transparency (or opacity) of the image. Coding the alpha channel jointly with other channels is hugely complex. Furthermore, the alpha channel often has dramatically different characteristics and quality requirements, and coding jointly may "pollute" adaptation processes of other channels and hurt coding performance.

To reduce complexity and ensure coding performance, coding of an alpha channel can be independent of other channels. Payloads of the alpha channel and other channels can be multiplexed to produce an integrated bitstream.

The presence of an alpha channel can be signaled with a syntax element. Bitstream processing can differ based on whether an alpha channel is present. For example, if an alpha channel is present, an image can be coded as a Y_ONLY image. In one implementation, transform, prediction and entropy coding of the alpha channel is identical to the corresponding operations of an Y_ONLY channel. This reduces the implementation complexity of the decoder as it does not have to separate code path to decode the alpha plane. However, in an entropy coding process, the context used by the alpha plane is independent of the context used by the image plane. Here, the context defines the collection of entropy coding parameters, including choice of code table, discriminant used in switching between code tables, coefficient scan order, coefficient models, etc.

A 1-bit syntax element (ALPHA_CHANNEL_PRESENT) can be used in image header to simply and efficiently identify if an alpha channel is present. For example, if ALPHA_CHANNEL_PRESENT==1, an alpha channel is present; an alpha channel is not present otherwise.

Signaled alpha channel information also can be used for one or more of the following.

If ALPHA_CHANNEL_PRESENT==1, information (e.g., all image size, tiling structure, and windowing parameters) in image header applies to both the "image" plane (the actual pixel information (luma and chroma)) and the alpha plane. The parameters which have identical values in both the image plane and alpha plane such as image width and image height, tiling related syntax elements, are specified only once in the image header to reduce overhead information.

If ALPHA_CHANNEL_PRESENT==1, alpha channel has a separate plane header right after the byte-aligned plane header of the image plane, specifying its own subband info, bitdepth info, and quantization info. This allows these parameters to be independently specified for the image plane, and for the alpha plane. In particular, the design supports the lossless coding of alpha plane and lossy coding of the image plane (and vice versa).

If ALPHA_CHANNEL_PRESENT==1, alpha channel has a tile header immediately after the tile header of other channels for each tile.

If ALPHA_CHANNEL_PRESENT==1, bitstream payload of an alpha channel macroblock is signaled immediately after the bitstream payload of the collated macroblock of other channels. This bitstream structure facilitates region of interest decoding as well as compressed domain operations such as tile extraction.

VI. Block Transform-Based Coding

Transform coding is a compression technique used in many digital media (e.g., audio, image and video) compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

Figure 7:
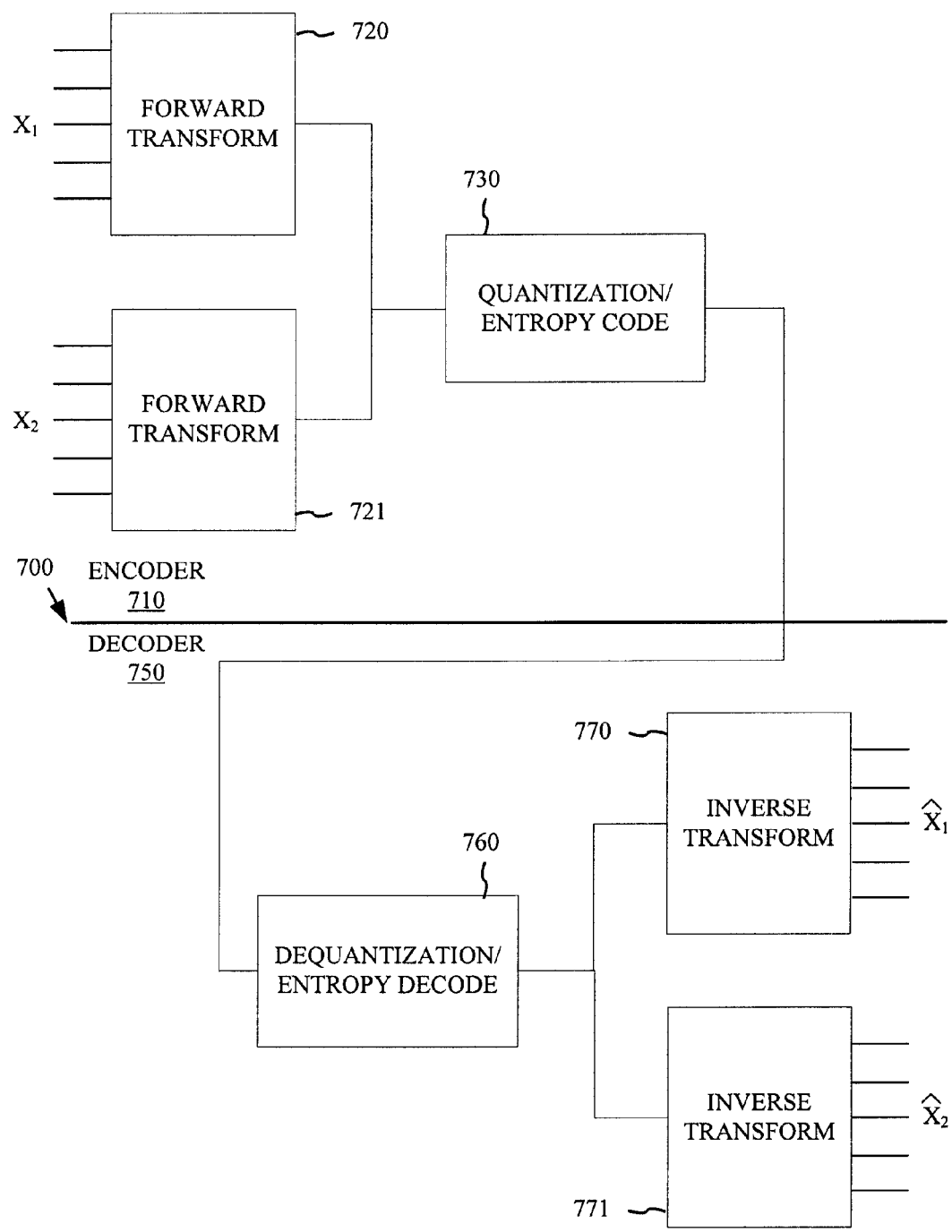
FIG. 7 is a block diagram of a block transform-based codec.

More specifically, a typical block transform-based encoder/decoder system 700 (also called a "codec") shown in FIG. 7 divides the uncompressed digital image's pixels into fixed-size two dimensional blocks ($X_1, \ldots X_n$), each block possibly overlapping with other blocks. At an encoder 710, a linear transform 720-721 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 730 (i.e., reduced in resolution, such as by dropping least significant bits of the coefficient values or otherwise mapping values in a higher resolution number set to a lower resolution), and also entropy or variable-length coded 730 into a compressed data stream. At decoding, the transform coefficients will inversely transform 770-771 to nearly reconstruct the original color/spatial sampled image/video signal (reconstructed blocks $\hat{X}_1, \ldots \hat{X}_n$).

The block transform 720-721 can be defined as a mathematical operation on a vector x of size N. Most often, the operation is a linear multiplication, producing the transform domain output y=Mx, M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations. The matrix multiplication is applied separably along each dimension of the data (i.e., both rows and columns).

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 750, the inverse of these operations (dequantization/entropy decoding 760 and inverse block transform 770-771) are applied on the decoder 750 side, as shown in FIG. 7. While reconstructing the data, the inverse matrix $M^{-1}$ (inverse transform 770-771) is applied as a multiplier to the transform domain data. When applied to the transform domain data, the inverse transform nearly reconstructs the original time-domain or spatial-domain digital media.

In many block transform-based coding applications, the transform is desirably reversible to support both lossy and lossless compression depending on the quantization factor. With no quantization (generally represented as a quantization factor of 1) for example, a codec utilizing a reversible transform can exactly reproduce the input data at decoding. However, the requirement of reversibility in these applications constrains the choice of transforms upon which the codec can be designed.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks.

VII. Exemplary Encoder/Decoder Implementation

Figure 8:
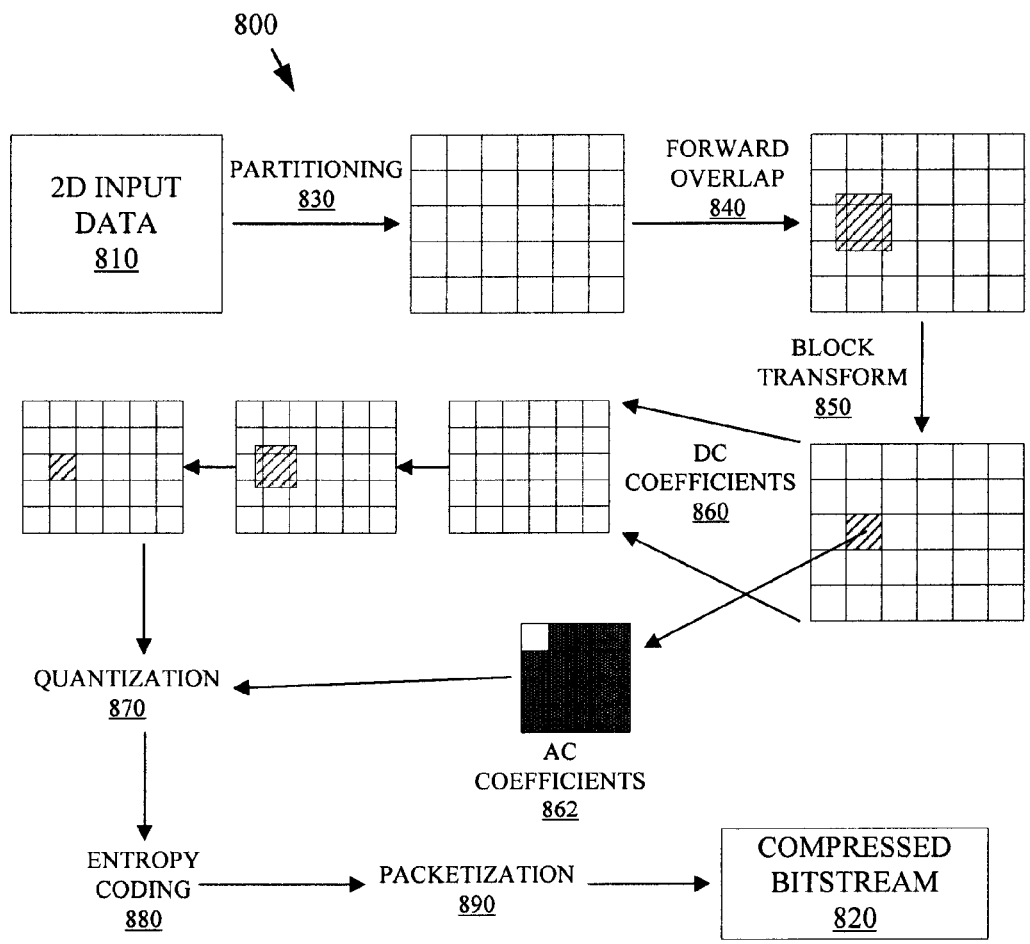
FIG. 8 is a flow diagram of a representative encoder.
Figure 9:
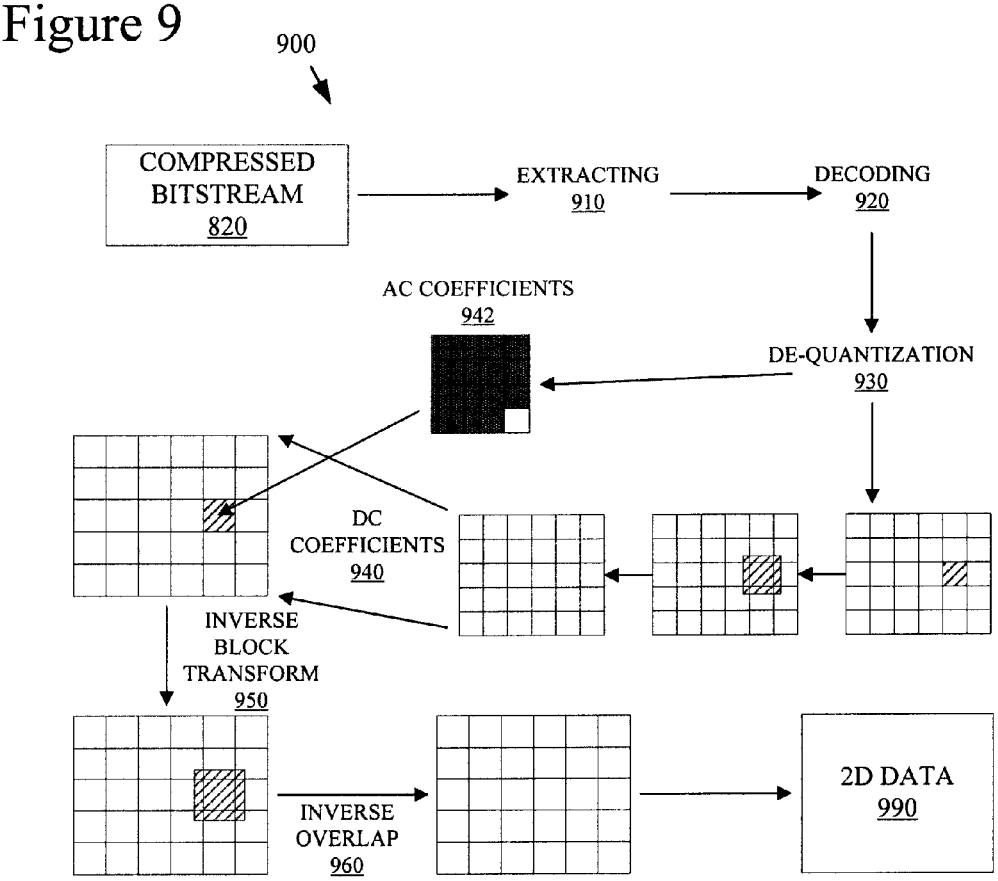
FIG. 9 is a flow diagram of a representative decoder.

FIGS. 8 and 9 are a generalized diagram of the processes employed in a representative 2-dimensional (2D) data encoder 800 and decoder 900. The diagrams present a generalized or simplified illustration of a compression system incorporating the 2D data encoder and decoder. In alternative compression systems, additional or fewer processes than those illustrated in this representative encoder and decoder can be used for the 2D data compression. For example, some encoders/decoders may also include color conversion, color formats, scalable coding, lossless coding, macroblock modes, etc. The compression system (encoder and decoder) can provide lossless and/or lossy compression of the 2D data, depending on the quantization which may be based on a quantization parameter varying from lossless to lossy.

The 2D data encoder 800 produces a compressed bitstream 820 that is a more compact representation (for typical input) of 2D data 810 presented as input to the encoder. For example, the 2D data input can be an image, a frame of a video sequence, or other data having two dimensions. The 2D data encoder divides a frame of the input data into blocks (illustrated generally in FIG. 8 as partitioning 830), which in the illustrated implementation are non-overlapping 4×4 pixel blocks that form a regular pattern across the plane of the frame. These blocks are grouped in clusters, called macroblocks, which are 16×16 pixels in size in this representative encoder. In turn, the macroblocks are grouped into regular structures called tiles. The tiles also form a regular pattern over the image, such that tiles in a horizontal row are of uniform height and aligned, and tiles in a vertical column are of uniform width and aligned. In the representative encoder, the tiles can be any arbitrary size that is a multiple of 16 in the horizontal and/or vertical direction. Alternative encoder implementations can divide the image into block, macroblock, tiles, or other units of other size and structure.

A "forward overlap" operator 840 is applied to each edge between blocks, after which each 4×4 block is transformed using a block transform 850. This block transform 850 can be the reversible, scale-free 2D transform described by Srinivasan, U.S. patent application Ser. No. 11/015,707, entitled, "Reversible Transform For Lossy And Lossless 2-D Data Compression," filed Dec. 17, 2004. The overlap operator 840 can be the reversible overlap operator described by Tu et al., U.S. patent application Ser. No. 11/015,148, entitled, "Reversible Overlap Operator for Efficient Lossless Data Compression," filed Dec. 17, 2004; and by Tu et al., U.S. patent application Ser. No. 11/035,991, entitled, "Reversible 2-Dimensional Pre-/Post-Filtering For Lapped Biorthogonal Transform," filed Jan. 14, 2005. Alternatively, the discrete cosine transform or other block transforms and overlap operators can be used. Subsequent to the transform, the DC coefficient 860 of each 4×4 transform block is subject to a similar processing chain (tiling, forward overlap, followed by 4×4 block transform). The resulting DC transform coefficients and the AC transform coefficients 862 are quantized 870, entropy coded 880 and packetized 890.

The decoder performs the reverse process. On the decoder side, the transform coefficient bits are extracted 910 from their respective packets, from which the coefficients are themselves decoded 920 and dequantized 930. The DC coefficients 940 are regenerated by applying an inverse transform, and the plane of DC coefficients is "inverse overlapped" using a suitable smoothing operator applied across the DC block edges. Subsequently, the entire data is regenerated by applying the 4×4 inverse transform 950 to the DC coefficients, and the AC coefficients 942 decoded from the bitstream. Finally, the block edges in the resulting image planes are inverse overlap filtered 960. This produces a reconstructed 2D data output 990.

In an exemplary implementation, the encoder 800 (FIG. 8) compresses an input image into the compressed bitstream 820 (e.g., a file), and the decoder 900 (FIG. 9) reconstructs the original input or an approximation thereof, based on whether lossless or lossy coding is employed. The process of encoding involves the application of a forward lapped transform (LT) discussed below, which is implemented with reversible 2-dimensional pre-/post-filtering also described more fully below. The decoding process involves the application of the inverse lapped transform (ILT) using the reversible 2-dimensional pre-/post-filtering.

The illustrated LT and the ILT are inverses of each other, in an exact sense, and therefore can be collectively referred to as a reversible lapped transform. As a reversible transform, the LT/ILT pair can be used for lossless image compression.

The input data 810 compressed by the illustrated encoder 800/decoder 900 can be images of various color formats (e.g., RGB/YUV4:4:4, YUV4:2:2 or YUV4:2:0 color image formats). Typically, the input image always has a luminance (Y) component. If it is a RGB/YUV4:4:4, YUV4:2:2 or YUV4: 2:0 image, the image also has chrominance components, such as a U component and a V component. The separate color planes or components of the image can have different spatial resolutions. In case of an input image in the YUV 4:2:0 color format for example, the U and V components have half of the width and height of the Y component.

As discussed above, the encoder 800 tiles the input image or picture into macroblocks. In an exemplary implementation, the encoder 800 tiles the input image into 16×16 pixel areas (called "macroblocks") in the Y channel (which may be 16×16, 16×8 or 8×8 areas in the U and V channels depending on the color format). Each macroblock color plane is tiled into 4×4 pixel regions or blocks. Therefore, a macroblock is composed for the various color formats in the following manner for this exemplary encoder implementation:

For a grayscale image, each macroblock contains 16 4×4 luminance (Y) blocks.

For a YUV4:2:0 format color image, each macroblock contains 16 4×4 Y blocks, and 4 each 4×4 chrominance (U and V) blocks.

For a YUV4:2:2 format color image, each macroblock contains 16 4×4 Y blocks, and 8 each 4×4 chrominance (U and V) blocks.

For a RGB or YUV4:4:4 color image, each macroblock contains 16 blocks each of Y, U and V channels.

Accordingly, after transform, a macroblock in this representative encoder 800/decoder 900 has three frequency sub bands: a DC sub band (DC macroblock), a low pass sub band (low pass macroblock), and a high pass sub band (high pass macroblock). In the representative system, the low pass and/or high pass sub bands are optional in the bitstream—these sub bands may be entirely dropped.

Further, the compressed data can be packed into the bitstream in one of two orderings: spatial order and frequency order. For the spatial order, different sub bands of the same macroblock within a tile are ordered together, and the resulting bitstream of each tile is written into one packet. For the frequency order, the same sub band from different macroblocks within a tile are grouped together, and thus the bitstream of a tile is written into three packets: a DC tile packet, a low pass tile packet, and a high pass tile packet. In addition, there may be other data layers.

Thus, for the representative system, an image is organized in the following "dimensions":

Spatial dimension: Frame→Tile→Macroblock;
Frequency dimension: DC|Low pass|High pass; and
Channel dimension: Luminance|Chrominance_0|Chrominance_1 ... (e.g. as Y|U|V).

The arrows above denote a hierarchy, whereas the vertical bars denote a partitioning.

Although the representative system organizes the compressed digital media data in spatial, frequency and channel dimensions, the flexible quantization approach described here can be applied in alternative encoder/decoder systems that organize their data along fewer, additional or other dimensions. For example, the flexible quantization approach can be applied to coding using a larger number of frequency bands, other format of color channels (e.g., YIQ, RGB, etc.), additional image channels (e.g., for stereo vision or other multiple camera arrays).

VIII. Exemplary Tiled Image Encoding/Decoding Process

This section describes an exemplary tiled image encoding/decoding process. This process is only an example and may vary from what is described here. For example, one or more of the features described above may be used in combination with this exemplary process, or with some other tiled image encoding/decoding process.

Figure 10:
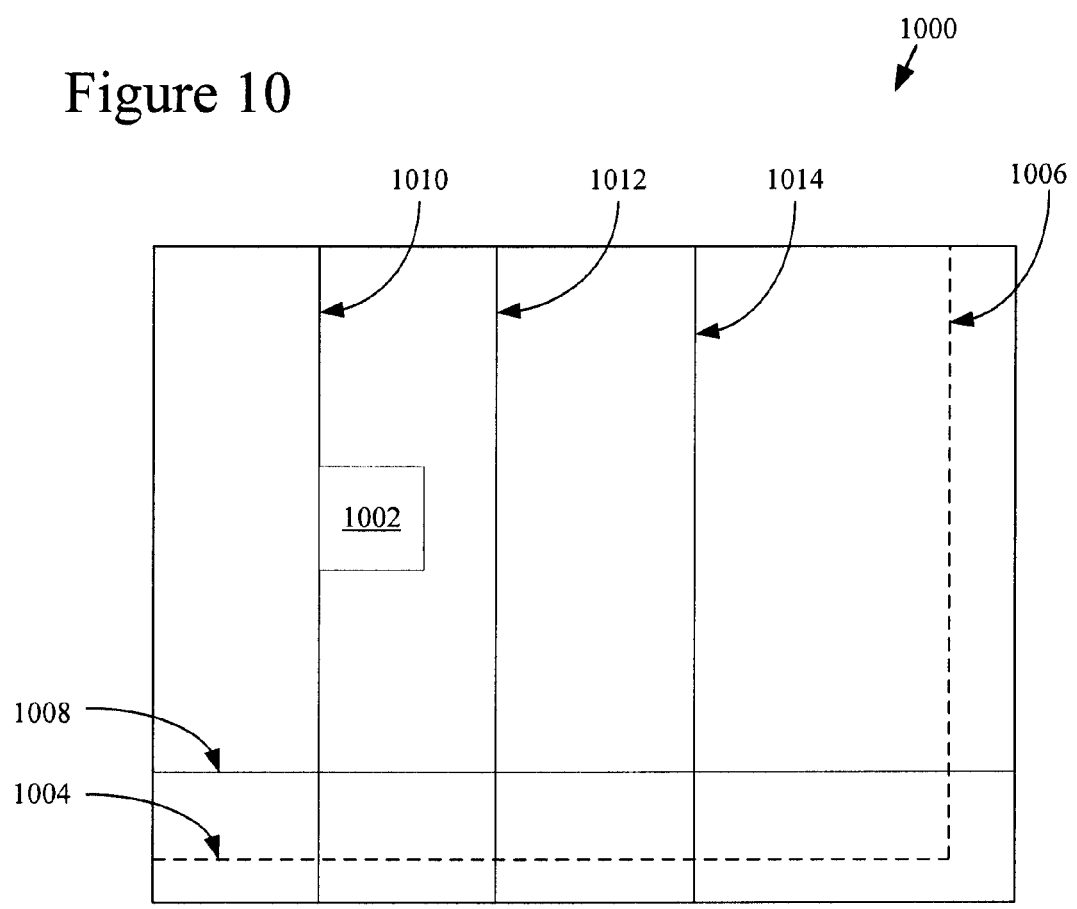
FIG. 10 is a block diagram illustrating a partitioned image according to one implementation.

FIG. 10 illustrates an image 1000 that is partitioned in accordance with an image structure hierarchy. The image 1000 is composed of non-overlapping four pixel by four pixel blocks. Though these blocks are not presented on the FIG. 10, the entire area of the image 1000 may be divided into such blocks. The blocks cover the entire image and may spill over the image boundaries. In this case, pixel values within a block but outside of the image are arbitrarily defined by extension or extrapolation. The blocks may be grouped into non-overlapping four block by four block clusters, known as macroblocks. For example, a macroblock 1002 resides within the image 1000. Like blocks, the macroblocks may spill over image boundaries. In this case, pixel values outside of the image and within a macroblock are arbitrarily defined such as by extension or extrapolation. For example, the dashed-lines 1004 and 1006 represent the original right and bottom edges of the image 1000. To align the edges of the image 1000 with the edges of the various macroblocks, the image 1000 includes extrapolated values for pixels residing beyond the dashed-lines 1004 and 1006.

The macroblocks may be grouped into regular structures called tiles. For example, tile boundaries 1008, 1010, 1012 and 1014 divide the image 1000 into eight tiles. The tiles extend to the edges of the image 1000 and form a regular pattern on the image 1000. Stated another way, the tiles in a horizontal row are of the same height and are aligned, while the tiles in a vertical column are of the same width and are aligned. The tiles may be of arbitrary size. The tiles extend beyond the dashed-lines 1004 and 1006 to ensure macroblock alignment.

Figure 11:
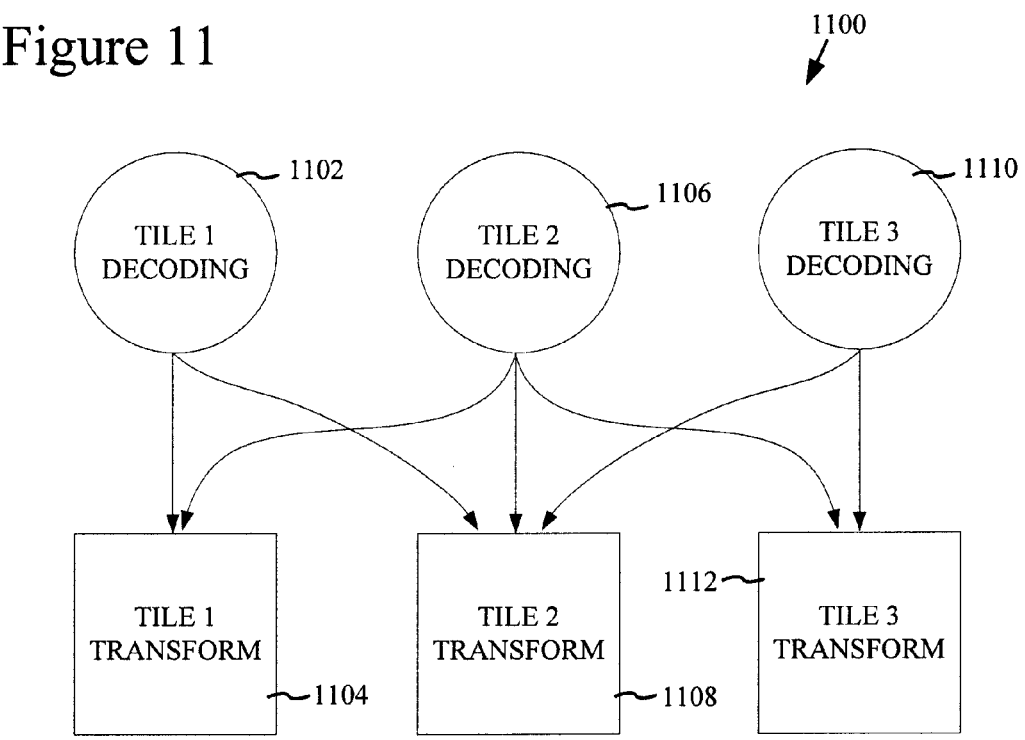
FIG. 11 is a block diagram illustrating the decoding of tiles according to one implementation.

FIG. 11 provides a schematic diagram of a system 1100 for independently decoding tiles. Data associated with a first tile is decoded into transform coefficients at a block 1102. These transform coefficients are used by a transform block 1104 to reconstruct the portion of an image associated with the first tile.

To reconstruct the first tile, the transform block 1104 also utilizes transform coefficients associated with a second tile. The second tile is adjacent to the first tile. Data associated with the second tile is decoded into transform coefficients by a block 1106. Transform coefficients from the block 1106 are shared with the transform block 1104 to aid in reconstructing the first tile. Likewise, a transform block 1108 reconstructs the second tile with transform coefficients from both the block 1102 and the block 1106 (i.e., coefficients from both the first and the second tiles).

To reconstruct the second tile, the transform block 1108 also utilizes transform coefficients associated with a third tile. The third tile is adjacent to the second tile. Data associated with the third tile is decoded into transform coefficients by a block 1110. These transform coefficients from the block 1110 are then shared with the transform block 1108 to aid in reconstructing the second tile. Similarly, a transform block 1112 reconstructs the third tile with transform coefficients from both the block 1106 and the block 1110. FIG. 11 depicts a one-dimensional embedding of tiles. In two dimensions, a tile may need to access data in up to 8 other tiles adjacent to it in order to reconstruct the tile. Alternatively, tiles are decoded in a different order or using different techniques.

Figure 12:
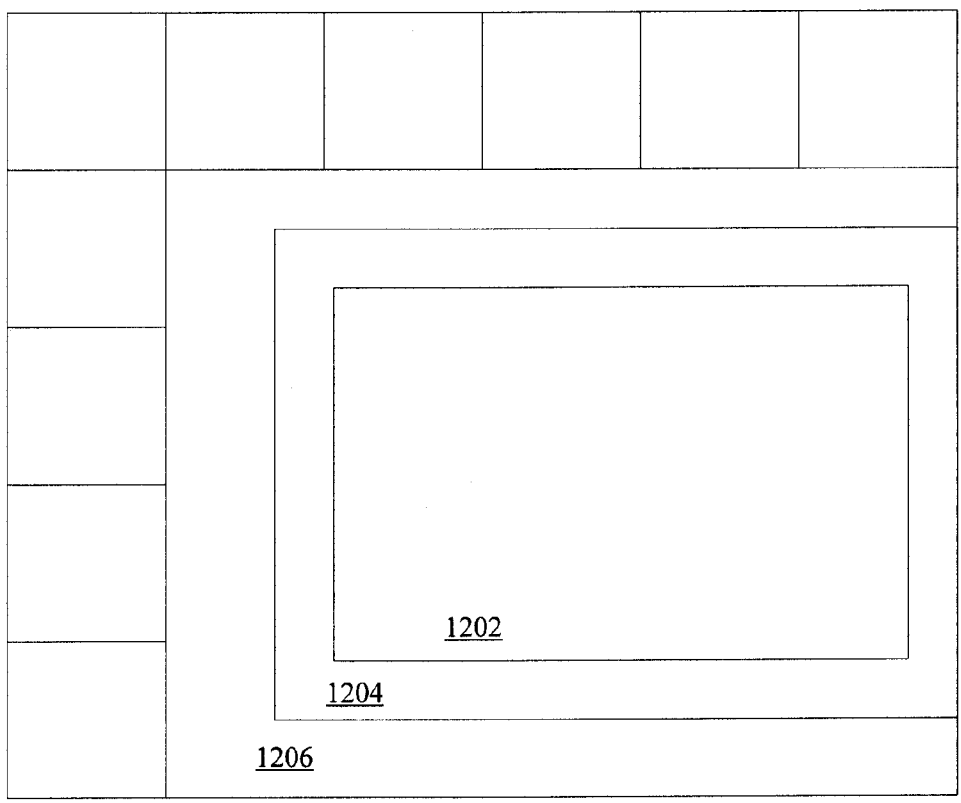
FIG. 12 is a block diagram illustrating an image undergoing cropping operations according to one implementation.

FIG. 12 illustrates an image 1200 undergoing cropping operations. A crop rectangle 1202 is identified within the image 1200. In one embodiment, the crop rectangle 1202 is permitted to be non-macroblock aligned in all directions. The crop rectangle 1202, for example, may be inscribed by three pixels on the top, left, right and bottom of the macroblock grid. This allows the crop rectangle 1202 to be arbitrarily aligned. To facilitate this arbitrary alignment, an extended signaling mechanism may be used in the image header of the new "cropped" image defined by the crop rectangle. For example, a flag may indicate whether the cropped image is inscribed. If the crop rectangle 1202 is inscribed, inscribing information may be sent to indicate the inscribed offsets in the top, left, bottom and right directions.

The image 1200 further includes an extended crop rectangle 1204. The extended crop rectangle 1204 may be obtained by stretching the crop rectangle 1202 by D pixels in each direction, except where a side runs into a boundary of the image 1200. In one embodiment, D is set to 0, 2 or 10 pixels for three permissible overlap modes that correspond to no overlap, overlap of high frequency alone and overlap of both low and high frequencies.

An extended cropped image 1206 is also included in the image 1200. The extended cropped image 1206 is obtained by macroblock aligning the extended crop rectangle 1204 in all directions. Such macroblock aligning allows selection of all macroblocks overlapping the extended crop rectangle 1204. Inscribed offsets may also correspond to the extended cropped image 1206.

Figure 13A:
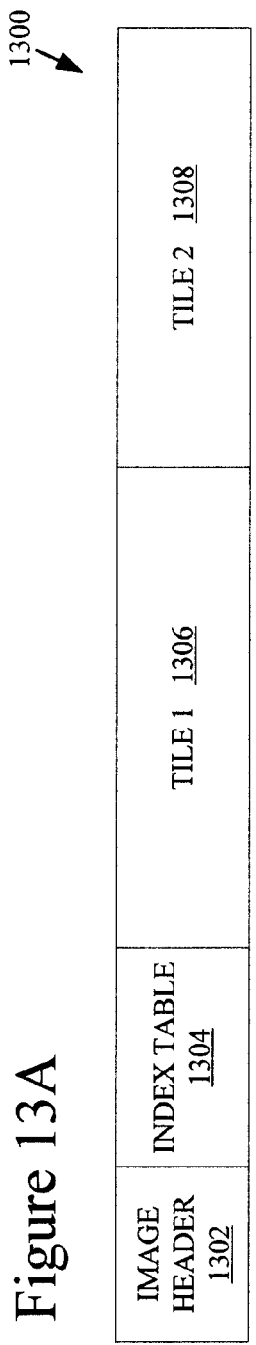
FIGS. 13A-C are block diagrams of a bitstream according to one implementation.
Figure 13B:
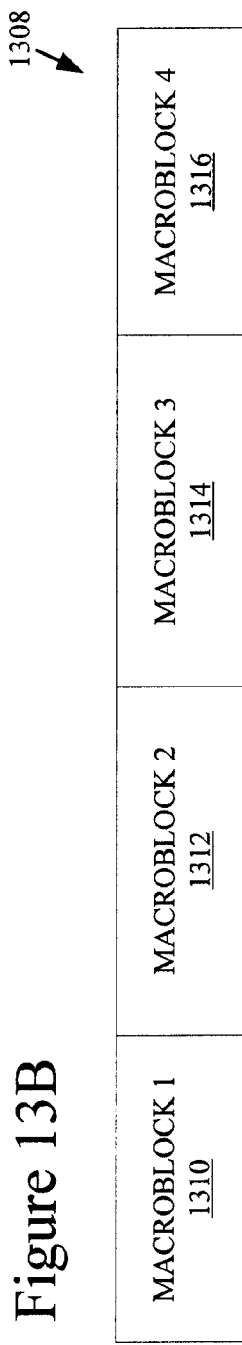
Figure 13C:
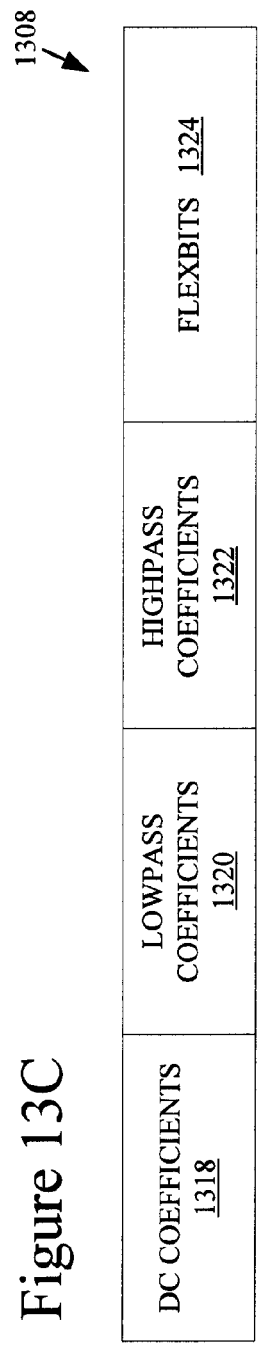

FIGS. 13A, 13B and 13C illustrate a part of a bitstream 1300 that contains information representing a digital image. Turning initially to FIG. 13A, the bitstream 1300 includes an image header 1302 and an index table 1304. These elements may contain a variety of information enabling the decoding of the bitstream 1300, such as syntax elements described above. Following the index table 1304, the bitstream 1300 includes a packet 1306 and a packet 1308. Each tile of an image can be placed in a separate packet.

A signal in the image header 1302 specifies whether spatial or frequency mode is used.

FIG. 13B illustrates the structure of the packet 1308 when the spatial mode is in operation. In the spatial mode, the bitstream of each tile is laid out in macroblock order, and the compressed bits pertinent to each macroblock are located together. The packet 1308 includes segments 1310, 1312, 1314 and 1316. Each of these segments is associated with one macroblock. The macroblock data is laid out in raster scan order, i.e. scanning left to right, top to bottom.

FIG. 13C illustrates the structure of the packet 1308 when the frequency mode is in operation. In the frequency mode, the bitstream of each tile is laid out as a hierarchy of bands. The first band 1318 carries the DC value of each macroblock in raster scan order. The second band 1320 carries the lowpass coefficients. For example, there may be fifteen lowpass coefficients in each macroblock for each color plane, with some possible exceptions. The third band 1322 carries the remaining highpass coefficients of each macroblock colorplane (with some possible exceptions). Finally, the fourth band 1324 is called Flexbits and is an optional layer that carries information regarding the low order bits of the highpass coefficients particularly for lossless and low loss cases.

Flexbits bands may be skipped in the bitstream. If the Flexbits bands are skipped, highpass subbands may also be skipped. Furthermore, if the highpass subbands are skipped, the lowpass subbands may be skipped. This applies to both bitstream modes. (Note that in the spatial mode, each macroblock consists of a DC part, a lowpass part, a highpass part and a Flexbits part). The decoder may have the flexibility to fill the skipped data, and the skipped segments may be signaled in the image header with a code. This embodiment may be useful for applications such as image downsampling and low bitrate coding.

Each mode of operation may have its own advantages. The spatial mode, for example, may be easier to implement and less complex, while having a smaller memory footprint on the encoder/decoder. The frequency mode may offer benefits of a hierarchical representation of the image, which allows for thumbnails, progressive display, fast zooming, and error protection.

Figure 14:
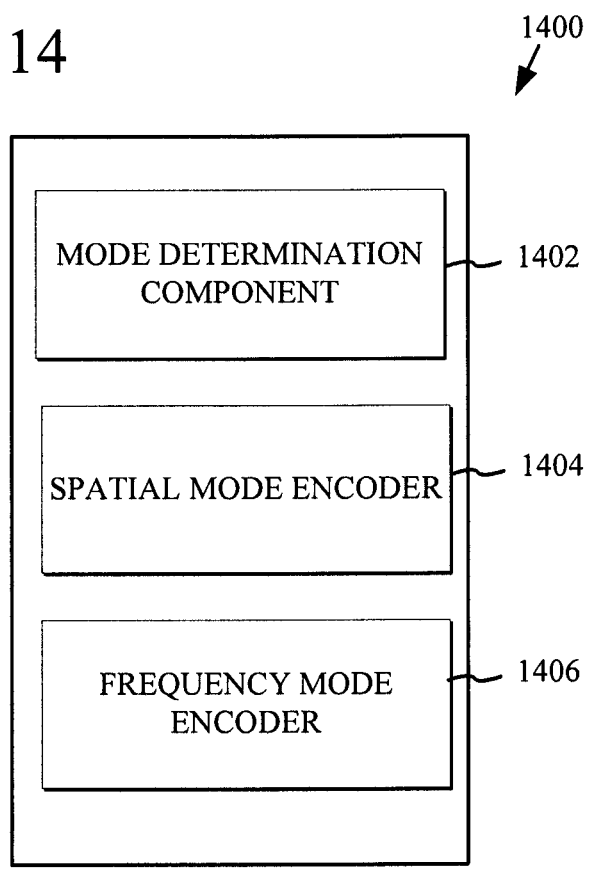
FIG. 14 is a schematic diagram illustrating a frequency/spatial mode system for encoding a bitstream according to one implementation.

FIG. 14 illustrates an encoding system 1400 that includes a mode determination component 1402. The mode determination component 1402 permits selection of either the spatial mode or the frequency mode. Once a mode is determined, an image may be reduced to a bitstream in accordance with the selected mode. The system 1400 includes a spatial mode encoder 1404 for use in accordance with the spatial mode. When the frequency mode is selected, a frequency mode encoder 1406 may be used in accordance with the frequency mode.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method comprising:
    receiving, as part of a bitstream,
        compressed image data for an image,
        syntax elements, wherein the syntax elements include image dimensions and a flag, the flag indicating which of a plurality of bit depths the image dimensions have, and windowing parameters for a region of interest within the image, wherein the windowing parameters define the dimensions of the region of interest and the position of the region of interest within the image;
    performing a first compressed domain operation using the windowing parameters, the first compressed domain operation comprising a crop operation, a flip operation, or a rotation operation, wherein the received windowing parameters facilitate the performing of the crop operation, the flip operation, or the rotation operation; and
    outputting a result of the first compressed domain operation.

2. The method of claim 1, wherein the windowing parameters comprise:
    plural original size parameters, the plural original size parameters comprising a width windowing parameter and a height windowing parameter; and
    plural original position parameters, plural original position parameters comprising a BOTTOM parameter, a LEFT parameter, a TOP parameter, and a RIGHT parameter.

3. The method of claim 2, wherein the performing the first compressed domain operation comprises performing a 90-degree counterclockwise rotation.

4. The method of claim 2, wherein the performing the first compressed domain operation comprises performing a horizontal flip.

5. The method of claim 2, wherein the performing the first compressed domain operation comprises performing a vertical flip.

6. The method of claim 1, wherein the region of interest is macroblock-aligned and the image is not macroblock-aligned.

7. The method of claim 1, wherein the region of interest and the image are macroblock-aligned.

8. The method of claim 1, further comprising:
    performing one or more additional compressed domain operations after the first compressed domain operation.

9. The method of claim 1, wherein the performing the first compressed domain operation comprises performing a horizontal flip, the method further comprising:
    performing a vertical flip; and
    performing a 90-degree clockwise rotation;

wherein the performing the horizontal flip, the performing the vertical flip, and the performing the 90-degree clockwise rotation results in a 90-degree counterclockwise rotation.

10. The computer-implemented method of claim 1, wherein the syntax elements are included in an image header of the bitstream.

11. The computer-implemented method of claim 1, wherein the image dimensions comprise an image width and an image height.

12. The computer-implemented method of claim 1, wherein the size of the image is used to determine which of the bit depths for the image dimensions is used.

13. A computer-implemented method comprising:
receiving an encoded bitstream, the encoded bitstream having syntax elements that specify an image size, a flag indicating which of a plurality of bit depths the syntax elements that specify the image size have, and plural region of interest parameters for a region of interest within an image, the plural region of interest parameters defining the dimensions of the region of interest and the position of the region of interest within the image;
decoding the encoded bitstream, the decoding including decoding encoded image data for the region of interest within the image in accordance with the plural region of interest parameters from the encoded bitstream; and
outputting a result of the decoding.

14. The method of claim 13 further comprising:
performing a crop operation, an image flip operation or an image rotation operation after the decoding of the plural region of interest parameters.

15. A computer-readable memory or storage medium storing computer-executable instructions which when executed by a computer cause the computer to perform a method, the method comprising:
receiving, as part of a bitstream,
compressed image data for an image,
syntax elements, wherein the syntax elements include image width and image height information and a flag indicating which of a plurality of bit depths the image width and image height information have, and
windowing information for a region of interest within the image, wherein the windowing information comprises plural region of interest parameters that define the dimensions of the region of interest and the position of the region of interest within the image;
performing a first compressed domain operation, the first compressed domain operation comprising a crop operation, a flip operation, or a rotation operation, wherein the received windowing information facilitates the performing of the crop operation, the flip operation, or the rotation operation;
from the bitstream that includes the compressed image data for the region of interest and the compressed image data for outside of the region of interest, decoding the compressed image data for the region of interest as specified by the plural region of interest parameters in order to generate a decompressed representation of a part of the image; and
outputting the decompressed representation of the part of the image, the decompressed representation comprising the region of interest specified by the windowing information in the bitstream.

16. The computer-readable memory or storage medium of claim 15, wherein the plural region of interest parameters comprise:
plural original size parameters, the plural original size parameters comprising a WIDTH parameter and a HEIGHT parameter; and
plural original position parameters, plural original position parameters comprising a BOTTOM parameter, a LEFT parameter, a TOP parameter, and a RIGHT parameter.

17. The computer-readable memory or storage medium of claim 16, wherein the performing the first compressed domain operation comprises performing a 90-degree counterclockwise rotation by:
defining a 90-degree counterclockwise rotated WIDTH parameter to be equal to the original HEIGHT parameter;
defining a 90-degree counterclockwise rotated HEIGHT parameter to be equal to the original WIDTH parameter;
defining a 90-degree counterclockwise rotated LEFT parameter to be equal to the original BOTTOM parameter;
defining a 90-degree counterclockwise rotated TOP parameter to be equal to the original LEFT parameter;
defining a 90-degree counterclockwise rotated RIGHT parameter to be equal to the original TOP parameter; and
defining a 90-degree counterclockwise rotated BOTTOM parameter to be equal to the original RIGHT parameter.

18. The computer-readable memory or storage medium of claim 16, wherein the performing the first compressed domain operation comprises performing a horizontal flip by:
defining a horizontally-flipped LEFT parameter to be equal to the original RIGHT parameter; and
defining a horizontally-flipped RIGHT parameter to be equal to the original LEFT parameter.

19. The computer-readable memory or storage medium of claim 16, wherein the performing the first compressed domain operation comprises performing a vertical flip by:
defining a vertically-flipped TOP parameter to be equal to the original BOTTOM parameter; and
defining a vertically-flipped BOTTOM parameter to be equal to the original TOP parameter.

20. The computer-readable memory or storage medium of claim 15, wherein the region of interest is macroblock-aligned and the image is not macroblock-aligned or the region of interest and the image are macroblock-aligned.

21. The computer-readable memory or storage medium of claim 15, wherein the performing the first compressed domain operation comprises performing a horizontal flip, the method further comprising:
performing a vertical flip; and
performing a 90-degree clockwise rotation;
wherein the performing the horizontal flip, the performing the vertical flip, and the performing the 90-degree clockwise rotation results in a 90-degree counterclockwise rotation.

22. A computer-readable memory or storage medium storing computer-executable instructions which when executed by a computer cause the computer to perform a method, the method comprising:
receiving an encoded bitstream comprising syntax elements and region of interest parameters, wherein the syntax elements include image width, image height, tile width, tile height, and a flag indicating which of a plurality of bit depths the image width, image height, tile width, and tile height syntax elements have; and wherein the region of interest parameters define the dimensions of a region of interest and the position of the region of interest within the image;
decoding the encoded bitstream, the decoding including decoding encoded image data for the region of interest within the image in accordance with the plural region of interest parameters from the encoded bitstream; and outputting a result of the decoding.

23. The computer-readable memory or storage medium of claim 22, wherein the method further comprises:

performing a crop operation, an image flip operation or an image rotation operation after the decoding of the plural region of interest parameters.

* * * * *